INVENTOR.
LEWIS M. BURROWS
BY
Baldwin & Martin
ATTORNEYS

March 25, 1969  L. M. BURROWS  3,434,500
FLUID PRESSURE REDUCER

Filed Dec. 23, 1964  Sheet 4 of 7

INVENTOR.
LEWIS M. BURROWS
BY
Baldwin & Martin
ATTORNEYS

March 25, 1969 L. M. BURROWS 3,434,500
FLUID PRESSURE REDUCER

INVENTOR.
LEWIS M. BURROWS
BY
*Baldwin & Martin*
ATTORNEYS

*INVENTOR.*
LEWIS M. BURROWS
BY
*Baldwin & Martin*
ATTORNEYS

March 25, 1969 — L. M. BURROWS — 3,434,500
FLUID PRESSURE REDUCER
Filed Dec. 23, 1964 — Sheet 7 of 7

INVENTOR.
LEWIS M. BURROWS
BY Baldwin & Martin
ATTORNEYS

United States Patent Office 3,434,500
Patented Mar. 25, 1969

3,434,500
FLUID PRESSURE REDUCER
Lewis M. Burrows, North Quincy, Mass., assignor to Dresser Industries, Inc., Dallas, Tex., a corporation of Delaware
Filed Dec. 23, 1964, Ser. No. 420,631
Int. Cl. F15d 1/00
U.S. Cl. 138—42                    15 Claims This invention relates generally to fluid pressure reducing devices and more particularly to a novel and improved means for providing a restriction in a fluid flow path thereby to effect a pressure drop in the fluid.

While there are many applications in which it is desired to reduce the pressure of a flowing fluid, and this invention may find utility in many of these applications the invention is particularly adapted for use in and will be described in connection with a sampling valve for providing a controlled limited, low pressure flow of liquid from a high pressure source such as a water boiler, it being completely understood that the invention is not limited to this particular use.

There are various known methods of restricting the flow of a fluid to reduce the pressure of the fluid with the most common probably being the use of an orifice, or the like, located in series with a fluid line. Where it is desired to provide a very substantial reduction in pressure and/or flow using a single orifice, the fluid passing through the orifice may develop a very high velocity with attendant severe erosion of the wall of the fluid passage downstream of the orifice. When multiple orifices are used in series, the total pressure drop across any one orifice is $1/n$ times the total pressure drop across the device, where $n$ is the total number of orifices. Such a series connected orifice device will result in a lower velocity of fluid flow through each orifice, and thus less erosion, as compared to the use of a single orifice for the same total pressure drop. However, where a large pressure drop and a low capacity discharge are desired, the necessary orifice size may become so small, for example on the order of .040″ in diameter, as to make manufacture difficult and undesirably expensive.

Also, it has been proposed to throttle fluid flow by passing the fluid through a series of parallel connected restricted passages. With such a device and a given pressure drop, it is not possible to maintain a discharge rate as low as that of a device using a comparable number of series connected orifices. Also, with parallel connected restricted passages or orifices keep each orifice or passage quite small in order to achieve the pressure drop desired and thus the velocity through each orifice or passage is quite high with attendant erosion problems, and manufacturing cost is high.

It is the primary object of the present invention to provide a novel and improved device for providing a restriction in a fluid flow path.

It is a further object of this invention to provide a novel and improved fluid flow restrictor which does not develop fluid velocities as high as that developed by a single orifice providing a comparable capacity and pressure drop so as substantially to reduce erosion of parts due to high velocity fluid flow.

It is a further object of this invention to provide a novel and improved fluid flow restriction which will provide a flow area equivalent to a very small orifice without the costly manufacturing techniques involved in providing very small orifices.

It is a further object of this invention to provide a multi-stage fluid flow restriction of novel and improved construction which will provide a relatively large pressure drop and a limited low velocity discharge without the use of conventional orifices.

It is still another object of the present invention to provide such a multi-stage fluid pressure reducing device in which the pressure reducing and flow restricting portion of the device can be provided in a pre-assembled sub-assembly so as to be easily assembled and replaced as a unit in a pressure containing housing.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

Figure 1:
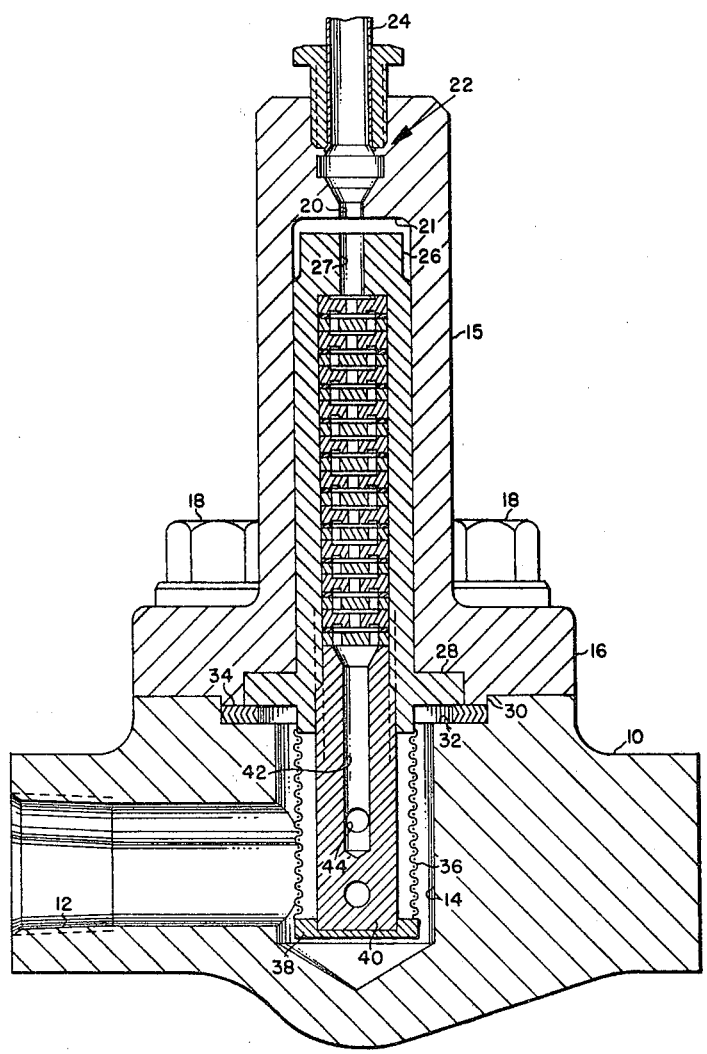
FIG. 1 is a longitudinal, cross-sectional view of a sampling valve constructed in accordance with the present invention.
Figure 2:
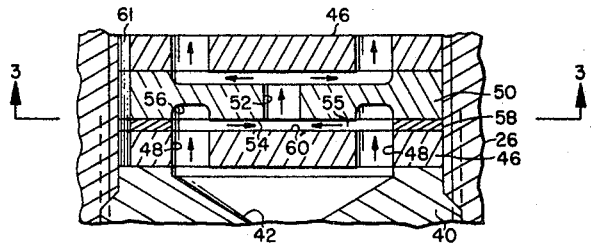
FIG. 2 is an enlarged, fragmentary cross-sectional view of a portion of the valve of FIG. 1.
Figure 3:
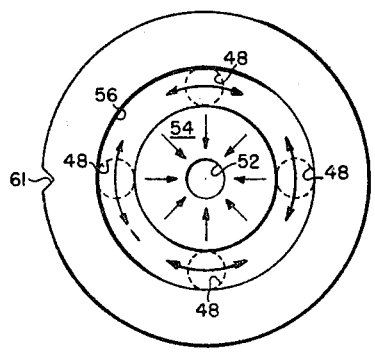
FIG. 3 is a cross-sectional view substantially along the line 3—3 of FIG. 2.

With reference to the drawings and particularly FIGS. 1 to 3 thereof, this invention will now be described in connection with a sampling valve for a high pressure boiler whereby water may be continuously drawn from the boiler. In accordance with the objects of the invention, it is intended to provide a low pressure, relatively small flow of water from the outlet of the sampling valve, although the inlet of the valve may be connected to a source of water at a high pressure, for example 600–3000 p.s.i., and high temperature, for example 600° F. The sampling valve incorporating the present invention is shown in FIG. 1 as comprising a body 10 having an inlet 12 connected at its inner end to a chamber 14 within the valve body and extending vertically of the inner end of the inlet 12. Mounted on the body 10 is a bonnet or cover 15. The lower end of the bonnet 15 has a radially outwardly extending flange 16 which may be secured to a mating boss on the body 10 by bolts 18 or the like. The bonnet 14 is provided at its upper end with an outlet 20. Suitable means, as generally indicated at 22, are provided for connecting the outlet 20 to an outlet conduit 24. The bonnet 14 is provided with an internal chamber or bore 21 extending longitudinally of the bonnet from the lower end of the bonnet next adjacent the chamber 14 in the body 10 of the valve. The upper end of the bore 21 terminates short of the upper end of the bonnet in communication with the inner end of the outlet 20.

Coaxially received within the bonnet 15 is a removable capsule comprising a generally cylindrical body 26. The capsule body 26 is provided adjacent its lower end with a radially outwardly extending annular flange 28 which is received within an enlarged portion or counterbore at the lower end of the bore 21 in the bonnet. The counterbore receiving the flange 28 is in part formed by an annular, axially projecting flange 30 extending from the underside of the flange 16 of the bonnet and being coaxially received within a counterbore 32 in the upper end of the valve body 10. Also received within the counterbore 32 are suitable sealing means or rings 34 which are generally annular in configuration and are clampingly engaged on one side by the outer end of the annular flange 30 on the bonnet and the underside of the flange 28 on the capsule body 14 and on the other side by the radially outwardly extending wall of the counterbore 32. Thus, a fluid seal is provided between the body 10, capsule body 26 and bonnet to prevent leakage from between the body 10 and bonnet as to prevent fluid within the chamber 14 in the body 10 from entering between the bonnet and capsule body.

The lower end of the capsule body terminates adjacent the upper end of the chamber 14 in the body 10. Mounted on the lower end of the capsule body is a generally tubular foraminate member 36. The upper end of the member 36 is secured in sealed relation, as by welding, to the lower end of the capsule body. The lower end of the member 36 is closed by an end cap 38. The foraminate member 36 provides a filter or screen preventing the passage of small particles of the foreign material radially inwardly of the filter.

The capsule body 26 is provided with a coaxially extending bore opening outwardly of the lower end of the body 26 and terminating at its upper end short of the upper end of the capsule body. A passage 27 in the capsule body extends from the upper end of the bore in the body 26 to open outwardly of the upper end of the body 26 which is spaced from the upper end of the bore 21 in the bonnet. Disposed within the bore in the capsule body in coaxially aligned stacked relation are a plurality of sets of co-operating elements or members with each set forming a pressure reducing stage and with the stages connected in series. The sets of elements are maintained in assembly within the capsule body by means of a retainer 40, the upper end of which is threadably engaged within the lower end of the bore in the capsule body 26 with the remainder of the retainer depending from the capsule body into the chamber 14 in the body 10 in coaxially radially inwardly spaced relation to the screen or filter 36. As can be seen in FIG. 1 a cap 38 closing the lower end of the screen 36 had a central cavity receiving the lower end of the retainer 40. The retainer 40 maintains the sets of members forming the pressure reducing stages in stacked engagement with the uppermost members being in engagement with the upper end wall of the bore within the capsule body. The retainer 40 is provided with a fluid passage 42 extending coaxially thereof from its upper end and terminating short of the lower end of the retainer. The upper end of the passage 42 is outwardly flared for a purpose which will be apparent hereinafter. The retainer 40 is further provided with a plurality of cross passages 44 connecting the central passage 42 with the interior of the screen 36. Accordingly, fluid entering the inlet 12 and the valve body will flow through the screen 36 into the branch passages 44 and then into the central passage 42 and out of the upper end thereof.

With reference to FIGS. 2 and 3, each set of elements providing a pressure reducing stage comprises a lower disc element or member 46, an upper disc element or member 50 and an intermediate member or spacer 58. The disc element or plate 46 has a plurality of openings 48 extending through the plate from one side to the other. The openings 48 are displaced angularly about and spaced radially outwardly from the longitudinal center line of the disc 46. In the specific embodiment of FIGS. 1–3, four openings 48 are provided in each disc 46 with the openings being spaced apart 90°. Disposed coaxially of and over the lower plate 46 in axially spaced relation is the upper plate or disc 50. The disc 50 is provided with a central passage opening 52 extending coaxially therethrough. The opening 52 is bounded on the side of the plate facing the plate 46 by a flat annular planar surface 54 extending about the opening 52 and extending a substantial distance radially outwardly therefrom in all directions. The underside of the plate 50, or in other words, the side facing the plate 46, is further provided with an annular cavity or recess 56 disposed coaxially of the opening 52 with its inner diameter defined by the outer diameter of the annular surface 54. In the specific embodiment shown, the outer diameter of the annular recess 56 as well as the radial width of the recess is such that the openings 48 in the plate 46 are in registery with the recess 56 when the plates 46 and 50 are in assembly as shown. The plates 46 and 50 are separated by the annular shim or spacer 58 having an outer diameter equaling the outer diameters of the plates 46 and 50 and an inner recess 56 in the underside of the plate 50.

In the portion of the valve shown in FIG. 2, the set of elements 46 and 50 and 58 are the lowermost set of elements in the valve of FIG. 1, whereby the openings 48 in the lower plate 46 are in fluid flow communication with the flared upper end of the passage 42 in the retainer 40. Accordingly, fluid flowing from the upper end of the passage 42 in the retainer will flow upwardly through the openings 48 in the lower plate into an annular fluid chamber extending coaxially about the opening 52 in the upper plate 50. This annular chamber is defined by the annular cavity 56 in the plate 50, by the portions of the member 46 in oppositely facing registry with cavity 56 and by that portion of the open space within the annular spacer or shim 58 which is in registry with the annular cavity 56. The fluid will flow from this annular chamber into an annular restricted passage 55 defined by the annular surface 54 on the top plate and the registering portion of the parallel oppositely facing and underlying surface 60 on the plate 46. The surface 60 on the bottom plate is at least coextensive with the annular surface 54 of the disc 50 and like the surface 54 is planar, and the surface 60 extends across the opening 52 in axially spaced relation.

As shown by the arrows in FIG. 3, the fluid flow through the annular restricted passage 55 will be in a direction radially inwardly toward the axis of the passage 55 from entirely around the outer periphery or inlet end of the passage and then in a direction axially of and through the outlet opening or passage 52 in the disc 50. The amount of flow restriction afforded by the passage 55 is determined by the effective area of the inner diameter end or outlet of the passage, which area is equal to the circumference of the passage at the inner diameter end thereof, or in other words, the circumference of the opening 52, times the height of the passage 55 or the spacing of the surfaces 54 and 60. In accordance with one aspect of the invention whereby the annular restricted passage 55 is the sole restriction between the passages 48 and 52, the effective flow area at the outlet end of the annular restricted passage 55 is substantially less than the effective flow area of the annular chamber surrounding the passage 55 or that of the outlet opening 52 in the disc 50. Thus, the height of the passage at its inner end is substantially less than ¼ the diameter of the passage 52. In connection with the foregoing, in a practical embodiment of the invention, the disc 50 was provided with an outlet passage 52 of approximately .093 inch in diameter. The annular passage 55 had an outer diameter of about .187 inch and an inner diameter of about .093 inch, and the spacer 58 had a thickness of about .005 inch. The depth of the annular chamber surrounding the restricted passage 55 was approximately .035 inch. With this construction the effective flow area at the outlet of the annular passage 55 was approximately .0015 square inch while the cross-sectional area of the opening 52 was approximately .007 square inch. It will be noted that a conventional orifice with an effective flow area of .0015 square inch would have a diameter of approximately .043 inch. Such small orifices are quite difficult and expensive to produce accurately and also develop quite high velocities of fluid flow. The small outlet area of the annular passage 55 is achieved in part by the close spacing of the surfaces 54 and 60. The accuracy of this spacing is in turn determined by the spacer 58. However, the spacer is fabricated from sheet stock which can be readily obtained in accurately controlled thicknesses as small as .005 inch and less, and the fabrication of the spacer can be readily accomplished without special manufacturing techniques.

It will further be observed that the outer diameter of the annular passage 55 is substantially greater than the inner diameter thereof so that the effective flow area of the inlet of the passage is substantially greater than that of the outlet. Inasmuch as the flow through the passage is radially inwardly of the passage it will be seen that the effective flow area of the passage is constantly reducing from the inlet to the outlet thereof thus affording a converging approach to the outlet of the passage. Further, it will be seen from FIG. 3 that the fluid discharging from the outlet of the annular passage 55 is directed radially inwardly from entirely about the axis, a result that each segment of the flowing fluid meets another segment flowing in the opposite coplanar direction. The result is a rapid decay of fluid velocity at the point where all segments meet, with a conversion of the kinetic energy of these streams to a pressure head. This reduction of the velocity head of the fluid prior to flow thereof through the opening 52 tends to reduce the erosion effect on portions of the flow passage downstream of the orifice. Thus, it will be seen that there has been provided a fluid flow restriction having an effective flow area equivalent to that of a very small orifice without requiring the difficult and costly machining of a small orifice and at the same time reducing the adverse effects of erosion due to a high velocity fluid flow and cavitation.

In the embodiment of FIG. 1 each of the sets of elements forming a pressure reducing stage is similar in construction. For example, and as shown in FIGS. 1 and 2, the second stage of the device is provided by a set of elements corresponding to the elements 46, 50 and 58 previously described. The second set of elements is arranged immediately above the lowermost set of elements with the lower disc 46 of the second set of elements resting on top of the upper disc 50 of the first stage. The upper surface of the disc 50 of the first set of elements is provided with a cavity disposed coaxially of the disc and having an outer diameter such that the openings 48 in the member 46 of the next adjacent set of members forming a pressure reducing stage will be in registry with the cavity 62. Thus, a flow path is provided between the outlet or upper end of the passage 52 in the disc 50 and the openings 48 in the disc 46 resting on top of the disc 50 so that the annular passage 55 of the next adjacent sets of elements are connected in series.

The number of stages is determined by the desired output flow rate of the valve and by the pressure drop desired at each stage. In this connection the pressure drop for each stage will be $\Delta P/n$ where "$\Delta P$" is the total pressure drop across the valve and "$n$" is number of stages. Also, generally speaking, for the same total pressure drop the flow rate will be equal to the square root of $1/n$. Thus, for the valve of FIG. 1 wherein ten pressure reducing stages are provided, the pressure drop at each stage will be $\frac{1}{10}$ of the total pressure drop across the valve, and the fluid flow output of the valve will be $\sqrt{1/10}$ or approximately 31.6 percent of the flow rate through a single orifice providing the same total pressure drop. The output flow rate may be varied by varying the number of stages or the thickness of the spacers separating the upper and lower discs of each set thereof so as to increase or decrease the height of the annular restricted passage 55.

It will be apparent that it is an advantage of the embodiment of FIGS. 1–3 to provide the spacers 58 as separate elements whereby the effective output area of the annular passage 55 can be readily set during assembly of the valve by selection of a spacer of desired thickness and whereby the area of the passageway may be varied by replacing one spacer with a spacer of a different thickness. However, it is within the scope of the invention to fabricate either the lower disc 46 or upper disc 50 to include the spacer 58 as an integral element. Also it is to be noted that while the restricted passage 55 has been described and shown as an annular passage, the invention contemplates that the passage 55 might be otherwise configured such as being divided into a plurality of sectors of an annulus. It will also be apparent to those skilled in the art that other restricted passage configurations, as well as other modifications of the specific structure shown, may be utilized to provide, as does the specific embodiment of FIGS. 1–3, aligned, coplanar fluid flow restriction means on opposite sides of the axis of an outlet passage for directing a plurality of streams of fluid radially inwardly toward the axis of the outlet passage so that the streams will infringe on one another to tend to convert the velocity head of the streams to a pressure head before the fluid flows in a direction axially of the outlet passage.

Figure 3A:
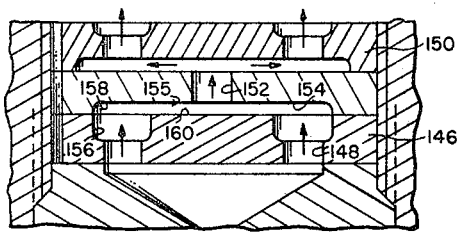
FIG. 3a is a view similar to FIG. 2 illustrating an alternative embodiment of the invention.

As shown in FIG. 3a, each set of members forming a pressure reducing stage might comprise a lower disc 146 having a pair of inlet openings 148 corresponding to the inlet openings 48 previously described but with the lower disc 146 being provided with an annular cavity 156 corresponding in dimensions to the cavity 56 previously described. The upper disc 150 is provided with a concentric cavity on its face next adjacent the disc 146 with the bottom of the cavity providing a surface 154, a portion of which cooperates with the underlying surface 160 on the lower disc 146 to provide an annular restricted passage 155 arranged concentrically of an opening 152 extending coaxially of the disc 150. The height of the restricted passage 155 is determined by the depth of the cavity on the underside of the disc 150. In this connection, the rim 158 of the cavity on the underside of the disc 150 is seated on the top of the disc 146 and is equivalent to the spacer 58 previously described. The concept and operation of the pressure reducing stage or device of FIG. 3a is equivalent to that of FIG. 3 and, therefore, no further description is necessary.

In assembling the sampling valve of FIG. 1, the sets of elements forming each pressure reducing stage are inserted into the bore within the capsule body 26. The retaining member 44 is then threaded into the capsule body to retain the aligned stacked elements in assembly. Each of the elements is in firm engagement with the next adjacent element or elements to provide a fluid seal between the stacked elements. The capsule is then assembled with the strainer 36 and end cap 38. This sub-assembly may then be slidably inserted into the bore in the bonnet 14, and the bonnet and capsule then assembled with the body 10 of the valve. If it is desired to disassemble the valve for cleaning or replacement of elements, the capsule may be readily disassembled, as a unit, from the valve, and the elements forming the pressure reducing stages are readily removable from the capsule.

The screen 36 has a mesh sufficiently small that it will preclude passage of particles larger than the height of the annular restricted passage 55. As previously described, the fluid flowing into the inlet 12 in the valve body will flow through the retainer 44 and into the openings 48 in the lowermost disc 46. The fluid will pass through the stacked discs and the various pressure stages and flow out of the opening 52 of the topmost disc 50 for communication with the passage 27 in the upper end of the capsule body and thus the outlet conduit 24.

With reference to FIGS. 4 through 13, there is shown an alternative embodiment of the present invention. In order to facilitate an understanding of the structure and operation of this embodiment, and in the interest of brevity, the structural elements of the embodiment of FIGS. 4 through 13 corresponding in structure or function with elements of the embodiment of FIGS. 1 to 3 have been designated by the same reference numerals used in designating the corresponding element of the embodiment of FIGS. 1 to 3 with the addition of the prefix numeral 2. In other words, the surface 254 in the embodiment of FIGS. 4 to 13 corresponds to the surface 54 of the embodiment of FIGS. 1 to 3.

Figure 4:
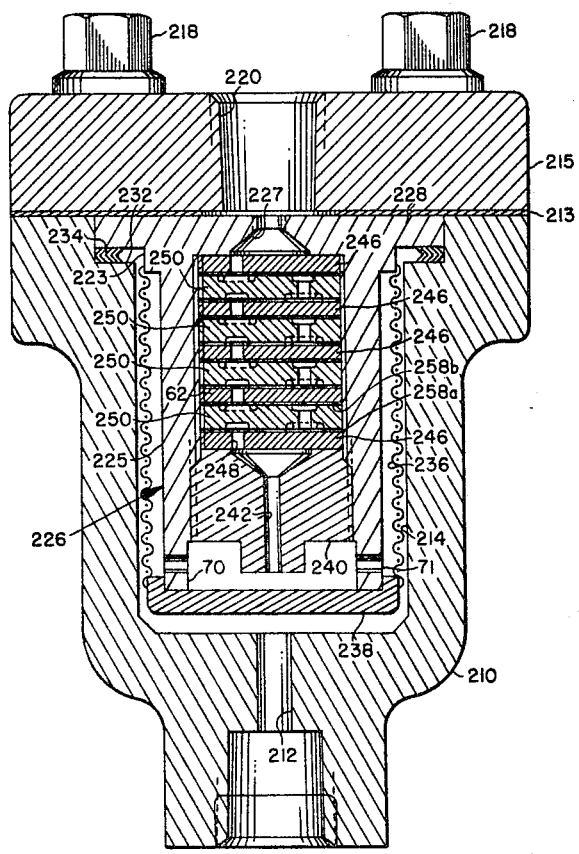
FIG. 4 is a longitudinal, cross-sectional view of a sampling valve incorporating an alternative embodiment of the present invention.

With particular reference to FIG. 4, this embodiment of a sampling valve incorporates the present invention comprises a body 210 having an inlet opening 212 at one end. The inlet 212 communicates with a cavity or chamber 214 within the body 210 which cavity opens at one end outwardly of the upper end of the body. The upper end of the body 210 is closed by a coverplate 215 secured to the body such as by bolts 218. An outlet 220 is provided in the cover 215 and communicates with the cavity or chamber 214 within the body 210. A gasket 213 is provided between the cover 215 and body 210. Disposed within the body 210 is a capsule including a body 226 having at its upper end an annular radially outwardly extending flange 228 received within a counterbore 232 of the cavity 214 in the valve body. The flange 228 is engaged on one side by the gasket 213 and on its underside by sealing means 234 disposed between the flange and the radially extending shoulder on the body forming the bottom of the counterbore 232 thereby effectively to provide a fluid seal preventing leakage from the cavity 214 in the body outwardly thereof.

The capsule body 226 is provided with a stepped portion 223 intermediate the flange 228 and the main portion 225 of the body providing a portion of greater diameter than the main portion 225 and from which depends a tubular screen 236 disposed coaxially over the main portion 225 of the capsule body in radially outwardly spaced relation thereto. An end cap 238 closes the bottom end of the screen 236. The end cap has a cavity on its upper face within which is engaged an annular projection 70 on the lower end of the capsule body 225 whereby the end cap is supported on the capsule body thereby to support the lower end of the screen on the capsule body. The capsule body is provided with a coaxially disposed opening or chamber extending from the lower end thereof and terminating in a reduced diameter outlet opening 227 at the upper end of the body. The outlet 227 is in fluid flow communication with the outlet 220 in the cap 215 of the valve.

Threadably engaged within the lower end of the opening in the capsule body is a retainer 240 having a coaxially extending passage 242 extending therethrough. The lower end of the passage 242 opens outwardly of the capsule body in spaced relation to the underlying surface of the end cap 238 whereby liquid introduced into the inlet 212 in the valve body will flow into the space between the valve body and the screen 236, through the screen and into a plurality of openings 71 extending radially through and spaced angularly about the axis of the extension 70 on the capsule body and thence into the passage 242 in the retainer 240. The upper end of the passage 242 in the retainer 240 is flared outwardly and is in communication with the underside of a disc member or element 246 of a plurality of axially aligned and stacked members or elements disposed within the capsule body and engaged between the inner end of the retainer 240 and the upper end of the bore in the capsule body. The stacked members cooperate to provide a plurality of series connected pressure reducing stages through which liquid passing from the inlet 212 to the outlet 220 must pass. More particularly the pressure reducing portion of the device of FIG. 4 comprises a plurality of axially aligned and spaced disc or plate elements 250 which are generally circular in configuration and are coaxially received within the bore within the capsule body 226. Disposed on opposite sides of each of the discs 250 is a flat disc member or separator plate 246. Engaged between the bottom of each of the discs 250 and the next adjacent separator 246 is a shim or spacer 258a. Disposed between the other or upper side of each disc 250 and the next adjacent separator 246 is a spacer or shim 258b. The separators 246 and the shims 258a and 258b are each circular in plan and of the same diameter as the discs 250 and are arranged coaxially thereof in predetermined angular relationship about the axis of the discs 250.

Figure 12:
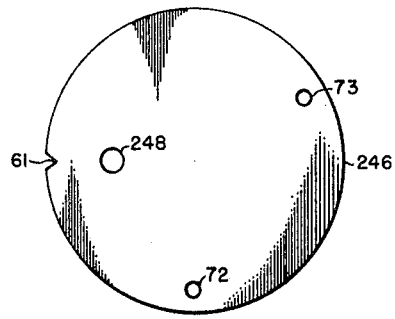
FIG. 12 is a top view of still a further element of the device of FIG. 4.

With reference to FIGS. 4 and 12, each of the separators 246 has an opening 248 extending therethrough from one side to the other and disposed between the center of the separator and the periphery therof. Each sparator 246 is also provided with a peripheral notch 61 which, in the specific embodiment shown, is in radial alignment with the opening 248 in the separator. Each disc 246 is further provided with a pair of locating openings 72, 73, each disposed between the center of the disc and the periphery thereof and spaced from the notch 261 by substantially different angular distances about the axis of the separator.

Figure 5:
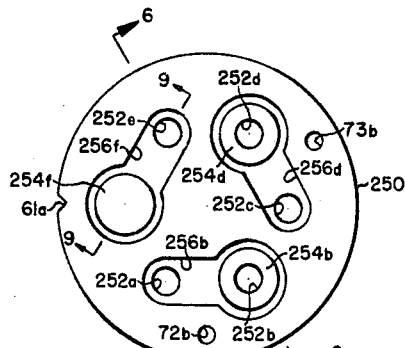
FIG. 5 is a top view of one of the elements of the valve of FIG. 4.
Figure 8:
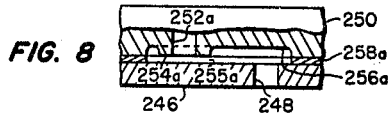
FIG. 8 is an enlarged fragmentary, cross-sectional view of a portion of the valve of FIG. 4.
Figure 6:
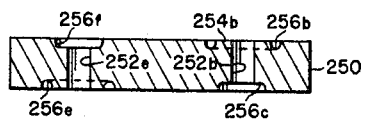
FIG. 6 is a cross-sectional view substantially along the line 6—6 of FIG. 5.
Figure 10:
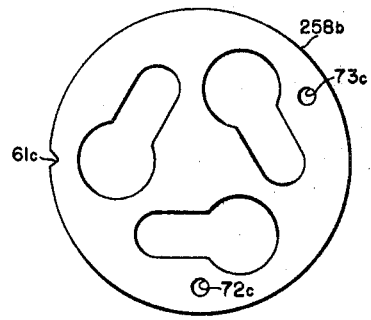
FIG. 10 is a top view of another of the elements of the device of FIG. 4.
Figure 7:
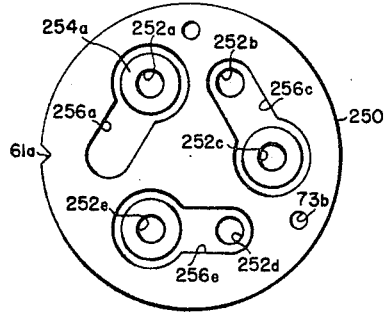
FIG. 7 is a bottom view of the element of FIG. 5.

With reference to FIGS. 5–7, each of the discs 250 is provided on the opposite flat faces or sides thereof with a plurality of cavities 256a–f. More particularly, and as shown in FIG. 5, three cavities 256b, 256d and 256f are provided on the top face of the disc with the cavities being spaced apart equiangularly about the axis of the disc and disposed between the center of the disc and the periphery thereof. With reference to FIG. 7, three similar cavities 256a, 256c and 256e are provided on the underside of the disc 250, with the cavities 256a, c and e being angularly apart about the axis of the disc 250 relative to the cavities 256b, d and f. Each disc 250 is further provided with a plurality of openings or passages 252a–e. The openings 252a–e extend from one side of the disc to the other and are arranged at equal radii about the axis of the disc with the openings being spaced apart equiangularly about the axis of the disc with the exception of the next adjacent pair of openings 252a and 252e which are angularly spaced apart a distance twice that of the other next adjacent pairs of openings. With reference to FIG. 7, one end of the cavity 256a is in radial alignment with a peripheral notch 61a in the disc 250 and is spaced from the center of the disc such that when the disc 250 is in overlying relationship to a separator 246, with the notches 61 and 61a in registry, the opening 248 in the separator, as is shown in FIG. 8, will be in underlying registry with one end of the cavity 256a. The cavity 256a extends generally in a chordwise direction relative to the disc 250 from the end thereof in radial alignment with the notch 261a and terminates in a portion extending entirely about the opening 252a in radially outwardly spaced relation thereto, thereby to form a cylindrical projection extending into the cavity and having at its distal end an annular flat surface 254a on and coplanar with the underside of the disc 250.

Figure 9:
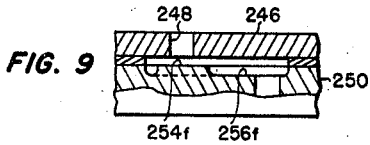
FIG. 9 is an enlarged fragmentary, cross-sectional view of another portion of the valve of FIG. 4.

With reference to FIG. 5, the end of the opening 252a at the top of the disc 250 opens into one end of the cavity 256b which is of the same size and shape of the cavity 256a thereby to form a flat annular surface 254b surrounding one end of the opening 252b which is of the same size and shape as the surface 254a. In the same manner, and as will be apparent from a consideration of FIGS. 5–7, the cavities 254c–f are in communication at one end with the openings 252b–e respectively, and the cavities 256c–e at their other ends provide flat annular surfaces 254c–e respectively surrounding one end of the openings 252c–e. The other end of the cavity 256f, as shown in FIG. 5, is shaped the same as said other end of the cavity 256a. However, as shown in FIGS. 5 and 9, the portion of the disc 250 surrounded by said other end of the cavity 254f is a solid circular rather than an annulus with the center of the surface 254f being in radial alignment with the peripheral notch 61a in the disc. The surface 254f is of the same diameter as the outer diameter of the annular surfaces 254a–e, and the center of the surface 254f is spaced equiangular between and at the same radii as the centers of the openings 252a and 252e in the disc 250.

Figure 11:
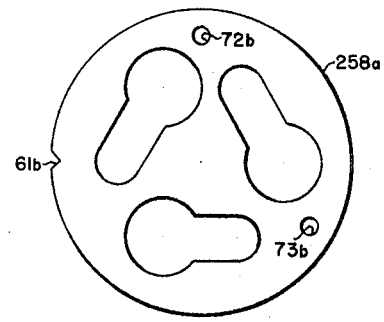
FIG. 11 is a bottom view of another of the elements of the device of FIG. 4.
Figure 13:
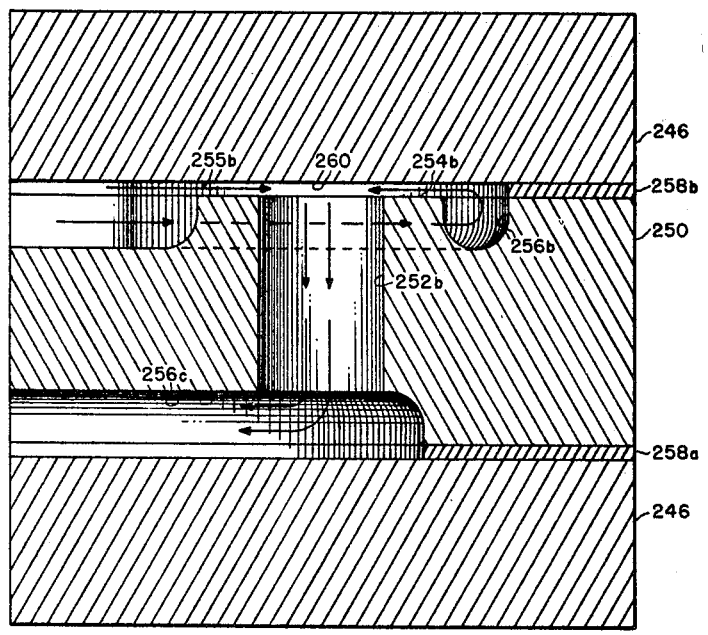
FIG. 13 is an enlarged, fragmentary, cross-sectional view of a portion of the valve of FIG. 4.

With reference to FIG. 11, each of the shims or spacers 258a is a flat circular disc wihch is relatively thin as in the case of the separator 58 of the embodiment of FIGS. 1–3. Each spacer 258a is provided with a plurality of openings of a shape, size and location identical with the cavities 256a, c and e on the underside of the disc 250, with the openings in the shim being registerable with the cavities to provide a fluid seal about the cavities and between the plate 250 and separator 248. Accordingly, when the shim 258a is in underlying relation to the disc 250, with the notches 61a and 61b aligned and the shaped openings in the shim in registry with the cavities in the underside of the disc, and a separator 248 is in underlying contact with shim 258a, the top surface of the separator will, as is shown in FIG. 8, be spaced from and extend parallel to the annular surface 254a to provide an annular restricted passage 255a between the cavity 256a and the opening 252a in the disc 250 with the flow through that said annular restricted passage 255a being in a direction radially inwardly of the restricted passage from entirely about the periphery thereof. In a like manner the disc 250, shim 258a and separator 246 will cooperate to provide an annular restricted passage between the cavities 256c and 256e and the respectively associated openings 252c and 252e. Correspondingly, and with reference to FIG. 10, the shim 258b is provided with a plurality of openings, which in size and shape conform to the cavities in the top surface of the disc 250 so that when the shim is in overlying contact with the top of the disc 250, with the openings in the shim in registry with the cavities in the top of the disc 250, and a second separator 246 is in overlying contact with the shim, the undersurface of the seperator will cooperate, as illustrated in FIG. 13, with the underlying annular surfaces 254b and d to provide an annular restricted passage for fluid flowing from the cavities 256b and 256d to the ends of the passages 252b and 252d respectively opening outwardly of the top side of the disc 250. With reference to FIG. 9, the separator plate 246, disposed on top of the plate 250, has its opening 248 aligned with the center of the circular flat surface 254f. The openings 248 in the disc 246 are of the same diameter as the openings 252a–e in the disc 250. Accordingly, fluid flowing into the cavity 256f at the top of the disc 250, will flow around the surface 254f and radially inwardly thereof from all directions passing through an annular restricted fluid passage defined at its outer diameter by the periphery of the surface 254f and at its inner diameter by the diameter of the outlet passage 248 in the overlying separator plate 246.

The relative dimensions of the cavities 256a–f, 248 and 252a–e, the surfaces 254a–f and the shims 258a and 258b are generally the same as those of the corresponding elements in the embodiment of FIGS. 1–3. Also, it will be clear that the cavities, mating openings in the shims and registering portions of the separators cooperate to provide fluid chambers respectively surrounding the cylindrical projections on the discs 250 and thus the flat surfaces 254a–f at the distal ends of the projections. As can be seen from FIG. 8, the structure of the pressure reducing stages associated with the surfaces 254a–e are generally similar to that of the structure of FIG. 3 and that the structure of the pressure reducing stage associated with the surface 254f is generally similar to that shown in the embodiment of FIG. 3a. Accordingly, it will be seen that in association with each disc 250 there are provided six pressure reducing stages through which fluid flowing into the cavity 256a will pass in series as the fluid flows axially about and through the disc 250 until it reaches the opening 248 in the separator 246 disposed on top of the plate 250.

In assembling the device of FIG. 4, the various members forming the pressure reducing stages may first be assembled to provide a sub-assembly which may then be inserted into the capsule body 226. In order to assure that the elements are assembled in proper orientation relative to each other, each of the elements is provided with a peripheral notch corresponding to the notch 61 in each of the spacers 246 and a pair of located openings corresponding to openings 72, 73 in each of the separators 246. A pair of locating dowels of a length no greater than the height of the final stack of pressure reducing elements is provided for reception in the locating openings corresponding to the openings 72, 73 of the separators 246. The lower most separator is placed over the dowels. A shim 258a is then angularly oriented so that the notch 61b is aligned with the notch 61 in the underlying separator 246 and the locating openings 72b and 73b are aligned with the locating dowels received in the openings 72, 73 whereupon the shim is then fitted over the dowels and onto the top of the separator plate. In the same manner the disc 250 is then assembled over the locating dowels with the notch 61a in alignment with the notches 61 and 61b. Also, in a like manner, the shim 258b is assembled over the dowels with its notch 61c in alignment with the notch 61b in the disc 250. This operation is repeated until the desired number of elements have been assembled.

The sub-assembly of stacked pressure reducing elements is then inserted into the capsule body and the retainer 240 threaded into the open end of the body to retain the elements in assembly. The capsule body may then be inserted into the valve body and the cover 215 bolted to the body. When it is desired to remove or replace the capsule body the cover 215 need merely be removed and the capsule removed from the valve body for cleaning or replacement.

Figure 14:
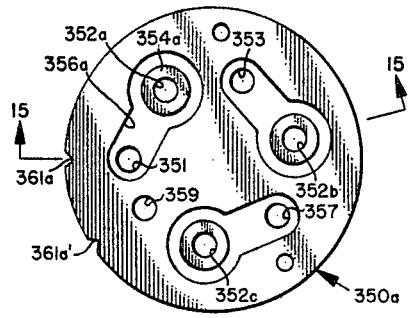
FIG. 14 is a top view of an element of another embodiment of the invention.
Figure 17:
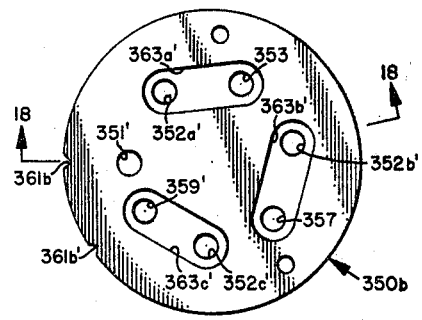
FIG. 17 is a top view of another element which cooperates with the element of FIG. 13.
Figure 15:
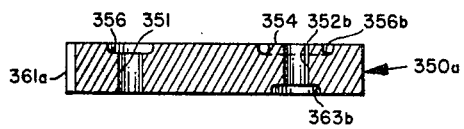
FIG. 15 is a cross-sectional view substantially along the line 15—15 of FIG. 14.
Figure 18:
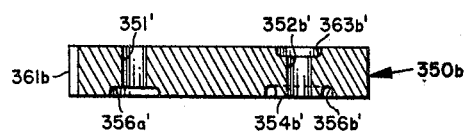
FIG. 18 is a cross-sectional view substantially along the line 18—18 of FIG. 17.
Figure 16:
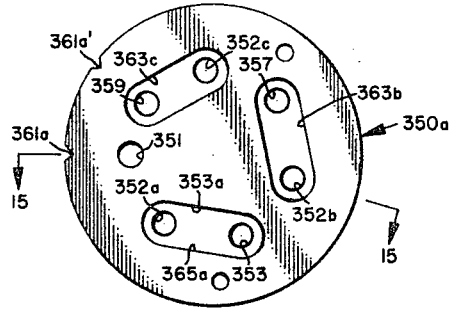
FIG. 16 is a bottom view of the element of FIG. 14.
Figure 19:
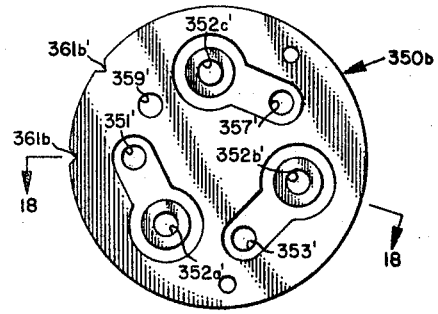
FIG. 19 is a bottom view of the element of FIG. 17.

A further alternate embodiment of the invention is illustrated in FIGS. 14–21. In this embodiment a pair of overlying disc members or plates 350a and 350b cooperate to provide a plurality of series connected fluid pressure reducing stages. With reference to FIGS. 14–16, the disc or plate 350a is provided with a plurality of openings 351, 352a, b and c, 353, 357 and 359 extending through the disc from one side to the other. These openings are of equal diameter, and the centers of the openings are at equal radii from the center of the disc. With reference to FIGS. 14 and 15, the flat surface of one side of the disc 350a is provided with a plurality of cavities 356a, 356b and 356c which are spaced angularly about the center of the disc. One end of the openings 351, 353 and 357, respectively, open into one end of the cavities 356a–c. The other ends of the cavities 356a–c extend about one of the ends of the openings 352a–c, respectively, in radially outwardly spaced relation thereby providing cylindrical projections extending respectively into the cavities in spaced relation to the bordering edge of the cavities and having at their distal ends planar annular surfaces 354a–c, respectively, surrounding and extending radially outwardly from said one of the ends of the openings 352a–c. With reference to FIGS. 15 and 16, the ends of the openings 352a and 353 are connected by a cavity 363a in the side of the disc 350a opposite the side having the cavities 356a–c. Correspondingly, the openings 352b and 357 and the openings 352c and 359 are connected, respectively, by cavities 363b and 363c on the same side of the disc 350a as the cavity 363a. With reference to FIGS. 17 to 19, the other disc 350b is constructed similarly to the disc 350a except that the various cavities and openings or passages are reversely arranged relative to those of the disc 350a so that the discs 350a and b may be placed in overlying coaxial stacked relation with the cavities 356a–c and 356a'–c' in overlying mating registry.

Figure 21:
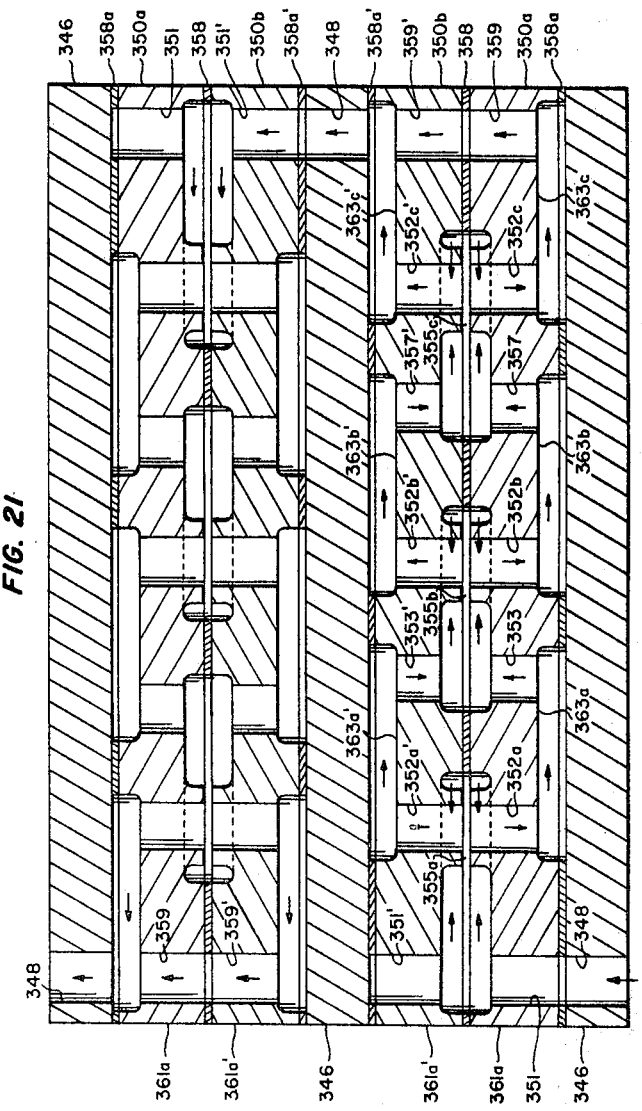
FIG. 21 is a developed, cross-sectional view of a plurality of the elements of FIGS. 14, 17 and 20 in stacked operative relation.
Figure 20:
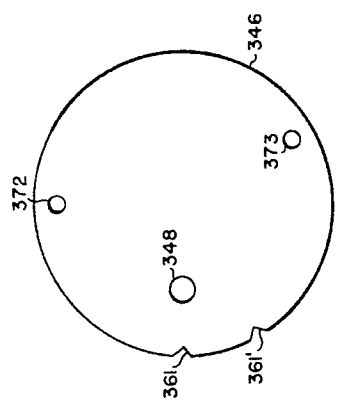
FIG. 20 is a top view of an element which cooperates with the elements of FIGS. 14 and 17.

The cooperation of the discs 350a and 350b will be readily understood from a consideration of FIG. 21 which is a developed view of an assembly of pressure reducing elements incorporating this embodiment of the invention with the development being taken along a circle concentric with the axis of the discs 350a and b and passing through the centers of the openings or passages extending through the discs. The assembly of FIG. 21 comprises a lower separator member 346, such as shown in FIG. 20, which is generally the same as the separators or spacers 46 and 246 previously described except that the separator 346 is provided with two peripheral locating notches. One notch 361 is in radial alignment with the opening 348 in the separator, and the other notch 361' is angularly spaced from the notch 361 about the axis of the separator a distance equal to the angular spacing of the openings 351 and 359 in the disc 350a. The assembly of FIG. 21 further comprises a disc or plate member 350a arranged coaxially over the separator 346 with a shim or gasket 358a engaged therebetween. The gasket 358a is a thin circular disc and is provided with a plurality of openings of the same shape and size as the cavities 363a to c of the disc 350a so that when the cavities 363a–c in the bottom of the disc 350a, the gasket 358a and next adjacent flat surface of the underlying separator 346 cooperate to provide discrete fluid passage connecting the passages in the disc at opposite ends of the cavities 363a–c, the gasket 350a also has an opening in registry with the opening 348 in the separator 346.

Resting on the other side of the disc 350a is a thin circular shim or gasket 358 provided with openings of the same shape, size and orientation as the cavities 356a–c and opening 359 in the disc 350a. Superposed on the shim 358 is the disc 350b. Superposed on top of the disc 350b is a second circular gasket or shim 358a' having openings coinciding with and of the same size and shape as the cavities 363a'–c' and opening 359' in the plate 350b. Disposed on top of the gasket 358a' is a second separator 346 arranged with its opening 348 in alignment with the opening 359' of the underlying disc 350b. Superposed on the second separator 346 is a second gasket or spacer 358a' on top of which is superposed a second disc 350b with its opening 351' in alignment with the opening 359' of the underlying first disc 350b. Arranged in stacked relation over the second disc 350b is a second shim 358, a second disc 350a, a second gasket 358a and a third separator 346. The opening 348 in the third separator 346 is in alignment with the openings 359, 359' of the next adjacent underlying pair of discs 350a and 350b, respectively.

It is intended that an assembly of superposed elements as just described may be substituted for the pressure reducing elements in the capsule 225 of the embodiment of FIGS. 4–13. If desired, only one pair of discs 350a and b may be used, or two or more pairs thereof may be used. With reference to FIGS. 14–21, and particularly FIG. 21, pressurized fluid entering the opening 348 in the lowermost separator 346, flows through the aligned opening in the next adjacent gasket 358a into the opening 351 in the disc 350a. Inasmuch as the opening 351' in the disc 350b is closed at its upper end by the undersurface of the second separator 346, all fluid will flow through into the chamber formed by the superposed cavities 356a, 356a' and corresponding opening in the shim 350a as indicated by arrows in FIG. 21. The annular surfaces 354a and 354a' associated with the cavities 356a and 356a' are axially spaced a distance governed by the thickness of the shim 358. The fluid will flow radially inwardly of and through the annular restricted passage 355 provided by the overlying spaced annular surfaces from about the entire circumference of said surfaces and into the aligned outlet passages 352a, 352a' to provide a fluid pressure drop in the same manner as in the case of the passage 55 in the embodiment of FIGS. 1–3. However, and in the present embodiment, the fluid flowing from the outlet of the annular passage 355a flows in opposite directions axially thereof and through the aligned openings 352a, 352a' in the disc 350a, 350b rather than in a single direction as in the previously described embodiments. The cavities 363a, 363a' in the discs 350a, 350b, the corresponding openings in the gaskets 358a, 358a' and the next adjacent surfaces of the separators 346 cooperate to provide discrete fluid flow passages connecting the openings 352a, 352a' with the aligned openings 353, 353', respectively, which open into the cavities 356b, 356b'.

In a like manner the fluid flows into the chambers formed in part by the cavities 356b, 356b', through the annular passage 355b formed by the overlying spaced annular surfaces 354b, 354b', into the aligned openings 352b, 352b' and then through the passages formed in part by the cavities 363b, 363b' to the aligned openings 357, 357' and the chambers formed by the cavities 356c, 356c'. The fluid flowing out of the restricted passage 355c' flows through the aligned openings 352c, 352c' into the passages formed in part by the cavities 363c, 363c'. The fluid in the passage formed in part by the cavity 363c flows into and through the aligned openings 359, 359' in the discs 350a, 350b and the aligned opening in the shim 358 into the end of the cavity 363c' remote from the opening 352c'. All of the fluid in the cavity 363c' flows through the opening 348 in the overlying second separator 346 and the mating openings in the gaskets 358a' disposed on opposite sides of the separator. Thus, it will be seen that the lowermost pair of discs 350a, 350b and associated elements cooperate to provide three pressure reducing stages angularly disposed about the axis of the disc.

In a like manner the uppermost pair of discs 350a, 350b provide three pressure reducing stages for fluid flowing therethrough. However, the uppermost pair of discs is inverted relative to the lowermost pair, and the direction of fluid flow therethrough about the axis of the second pair of discs is opposite that of the flow through the lower pair of discs. In other words, flow through the lower pair of discs would be generally from left to right as viewed in FIG. 21, or clockwise as viewed in FIG. 14, while flow through the upper pair of discs would be from right to left as viewed in FIG. 21.

It will be apparent to those skilled in the art that where a third pair of discs is to be provided, the third pair of discs and associated elements may be oriented in the same manner as the lower pair shown in FIG. 21 and stacked on top of the upper pair of discs of FIG. 21. Correspondingly, a fourth pair of discs may be provided by stacking the fourth pair on top of the third pair with the fourth pair being oriented in the same manner as the uppermost pair of FIG. 21. This procedure may be followed until the desired number of pairs of discs have been assembled.

In order to assist in assembly of the discs and associated elements, the discs 350a, 350b, respectively, are provided with peripheral notches 361a, 361a' and 361b, 361b' corresponding to the notches 361, 361' in the separators 346. The shims or gaskets 358, 358a and 358b are provided with corresponding notches and all of the stacked members are provided with openings corresponding to the openings 372, 373 in the separators 346. The notch 361' in the separator, and the corresponding notches in the other elements, are angularly spaced from the notch 361, and those corresponding thereto, a distance which is equal to the difference in the angular spacing of the locating openings 372, 373 from the notch 361. As previously mentioned, the notches 361, 361' are spaced apart an angular distance corresponding to the angular spacing of the passages 351 and 359 in the disc 350a. In assembling the stack of elements, a separator 346 is placed over a pair of locating pins or dowels with the pins extending through the openings 372, 373. When the lowermost pair of discs 350a and 350b and associated shims or gaskets 358, 358a and 358b are assembled in stacked relation, with their peripheral notches in alignment with the notches on the separator, this will assure proper orientation of the various parts. While assembling the second separator 348, however, the second separator is inverted and indexed angularly about the axis of the stack so that when assembled on the locating pins the notch 361' of the second separator will be aligned with the notch 361 of the first separator. This will offset the opening 348 in the second separator from that of the first so that the opening 348 of the second separator will be aligned with the outlet passages 359, 359' of the underlying pair of discs 350a, 350b.

The second pair of discs 350a, 350b and associated gaskets or shims 358, 358a and 358b are assembled with their notches in alignment with those of the second separator, thus assuring that the second set of elements will be properly oriented relative to each other and will be inverted relative to the first set. The third separator 348 is, of course, oriented in the same manner as the first separator. Thus, each pair of discs and associated elements and any number of pairs of discs may be assembled rapidly and with assurance that the various elements are properly oriented.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a fluid pressure reducing device a pair of overlying members, means providing an outlet opening in one of said members, means providing a fluid inlet opening in the other of said members, a raised annular surface on one of said members extending radially of and circumferentially about said outlet opening and cooperating to provide fluid flow restriction means connecting said inlet opening and outlet opening, said flow restriction means provding an annular distribution of opposed flow streams directed radially inwardly of said outlet opening thereby tending to convert the kinetic energy of said flow streams to a pressure head, said flow restriction means being the sole source of fluid flow into said outlet opening.

2. Fluid pressure reducing means comprising means providing a fluid inlet passage, means providing a fluid outlet passage, and flow restriction means providing flow communication between said inlet and outlet passages including interposed annular means providing interference to stream flow for directing the flow in an annular distribution radially inwardly of and into said outlet passage from about the axis of said outlet passage thereby to tend to convert the kinetic energy of fluid flowing out of said restriction means into a pressure head, said flow restriction means being the sole source of fluid flow into said outlet passage.

3. In a fluid pressure reducing device, means providing a passage for the flow of fluid toward an outlet, a laterally extending annular area constriction interposed in said passage at said outlet having a height thereat as measured laterally of the passage which is substantially less than ¼ the opening dimension of said outlet, and means providing an inlet passage communicating with said annular passage displaced from said constriction and having an effective flow area substantially greater than the effective flow area of said annular passage at said constriction.

4. In a fluid pressure reducing device, means providing an annular fluid passage for conducting fluid radially inwardly therethrough toward an outlet opening, an interposed annular constriction in said passage at said outlet having a fixed height at said outlet as measured axially of the passage which is substantially less than ¼ the dimensional opening of said outlet, inlet means for introducing fluid into said annular passage at a location removed from said constriction having an effective flow area greater than the flow area at the constriction of said annular passage to provide an annularly directed convergent passage for fluid flowing radially inwardly of said outlet.

5. A fluid pressure reducing device comprising a housing having a fluid inlet and a fluid outlet, and having a cylindrical chamber open at one end thereof, a plurality of disc like stacked members coaxially received in said chamber and having means providing a plurality of series connected fluid pressure reducing stages, each of said pressure reducing stages comprising an outlet passage in one of said members and an annular restricted fluid flow passage formed by cooperation between overlying spaced surfaces on said one member and a next adjacent member, said annular passage being disposed concentrically of said outlet passage and including means in said annular passage producing a radial flow annularly distributed into the outlet passage thereof, means connecting said inlet in the housing to a radially outward portion of said restricted passage at the pressure stage at one end of the series thereof, and means connecting the outlet passage associated with the pressure stage at the other end of the series thereof to the outlet in said housing.

6. In a pressure reducing device, a first member, a second member, the first and second members being disposed in overlying relation, means providing a plurality of cavities in the surface face of one of said members facing the other member, a plurality of cylindrical projections on the face of one of the members extending toward the other of the members, said projections being respectively associated with said cavities and extending thereinto in spaced relation to the bordering edges of the cavities, the distal end of each projection having a surface disposed in oppositely facing closely spaced relation to an overlying surface on the member opposite the member having said projection, each of said projections having associated therewith a passage in one of said members with the passage extending coaxially of the projection from one of said overlying surfaces respectively associated with the projection, means providing a fluid seal about each of said cavities and between the member having said cavities and the other of said members, means providing a fluid inlet communicating with one cavity, means including one passage respectively associated with a cavity other than said one cavity providing a fluid outlet, and means connecting in series the remaining cavities and passages other than said one cavity and said one passage.

7. In a pressure reducing device as described in claim 6, said means providing a fluid seal comprising a shim disposed between said first member and second member, said shim having a predetermined thickness determining the spacing of said overlying surface, said shim further having openings therein corresponding in shape to and registering with said cavities.

8. In a fluid pressure reducing device, a first member, a pair of second members respectively disposed on opposite sides of said first member, means on the first and second members cooperating to provide a plurality of annular flow restrictions connected in series by means including a chamber surrounding each of said annular restrictions and communicating directly with a portion of the restriction relatively radially outward thereof and an outlet passage extending coaxially of and from a portion of each annular restriction relatively radially inward thereof, each of said outlet passages being in flow communication with the chamber associated with the next annular restriction in the direction of the flow of fluid and means for introducing fluid into the chamber associated with the first annular restriction in said series.

9. In a fluid pressure reducing device, a first member, a pair of second members disposed on opposite sides of said first member, means on the opposite surfaces of said first member cooperating with means on the respectively adjacent surfaces of said second members to provide a plurality of annular flow series arranged restrictions disposed between said members and a plurality of recessed chambers respectively surrounding said annular restrictions and opening directly therein, a plurality of passages in said first member respectively communicating at one end with and extending coaxially of said annular restrictions, the other end of said passages communicating with the chamber respectively associated with the next annular restriction in the series thereof, each of the passages connecting an annular restriction and a chamber extending through said first member between an annular restriction at one surface of said first member and a chamber at the other surface thereof, an inlet passage in one of said second members communicating at one end with the chamber associated with the first annular restriction in said series, and an outlet passage in the other of said second members at one end communicating with the last annular series flow restriction associated with said first member.

10. In a fluid pressure reducing device, a pair of overlying members, said members being provided with a pair of outlet passages, each of said passages having one end in axially spaced and aligned relation to one end of the other passage, each of said outlet passages terminating at said one end thereof in a generally annular surface disposed coaxially of the outlet in the respective member passage, the annular surfaces on the respective members being generally opposite each other and coextensive in closely spaced overlying relation to provide an annular flow restriction communicating centrally with said one end of both outlet passages, and means for introducing fluid into a portion radially outward of said flow restriction.

11. In a pressure reducing device a pair of overlying members, means providing a pair of overlying cavities in said members, said cavities being in registry and at least in part defining a fluid chamber, each member being provided with a projection extending into the cavity in said member and toward the corresponding projection on the other member, the projections being in axial alignment, the distal ends of said projections having surfaces disposed in spaced relation and defining a fluid flow restriction, means providing at least one of said members with a fluid passage extending coaxially of and communicating at one end with the end surface on the projection, of said one of the members, each projection being in spaced relation to the bordering edge portion of its respective cavity, and means providing an inlet passage communicating with said fluid chamber.

12. In a fluid pressure reducing device, a pair of overlying members, means providing said members with a pair of overlying oppositely facing mating cavities, a shim engaged between said members and having an opening corresponding in shape to said cavities and registering with said cavities, said cavities and shim defining a fluid chamber, each member being provided with a projection extending into the cavity associated with the member in spaced relation to the bordering edge portion of the cavity, the projections being axially aligned and having oppositely facing end surfaces spaced apart a distance equal to the thickness of said shim, means providing each of said members with a fluid outlet passage extending therethrough and coaxially of the respective projection and means providing a fluid inlet passage to said chamber.

13. A fluid pressure reducing device comprising at least two members arranged in juxtaposed spaced apart relationship, a first of the members having an inlet fluid passage extending transverse to its face, and a second of the members having an outlet fluid passage extending transverse to its face, the axis of the passage in said second member being displaced laterally of the axis of the passage in said first member by a distance greater than the diameter of said passages, a narrow channel extending between the faces of said members and interconnecting the respective passages, and a boss aligned with the axis of at least one of the passages extending from one of the members toward the other to provide a constriction in said channel thereat.

14. The fluid pressure reducing device according to claim 13, in which a plurality of said members are arranged in stacked relationship, each member providing a pressure reducing stage in conjunction with the next adjacent member.

15. The fluid pressure reducing device according to claim 14, in which the respective members are disc-shaped members arranged in coaxial aligned stacked relationship.

References Cited

UNITED STATES PATENTS

| 1,927,947 | 10/1933 | Newell | 138—42 XR |
| 2,200,788 | 5/1940 | Coy | 138—42 XR |
| 2,210,448 | 8/1940 | Dodge | 138—42 |
| 2,662,590 | 12/1953 | Reich | 138—42 XR |
| 3,323,550 | 6/1967 | Lee | 138—39 |

FOREIGN PATENTS 780,188   7/1957   Great Britain.

LAVERNE D. GEIGER, *Primary Examiner.*

BRADFORD KILE, *Assistant Examiner.*